United States Patent
Hata et al.

(10) Patent No.: US 9,260,133 B2
(45) Date of Patent: Feb. 16, 2016

(54) FRICTION-STIR WELDED STRUCTURE

(71) Applicant: HONDA MOTOR CO., LTD., Minato-Ku, Tokyo (JP)

(72) Inventors: Tsunehisa Hata, Wako (JP); Toshikazu Hirobe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/416,471

(22) PCT Filed: May 30, 2013

(86) PCT No.: PCT/JP2013/064976
§ 371 (c)(1),
(2) Date: Jan. 22, 2015

(87) PCT Pub. No.: WO2014/017167
PCT Pub. Date: Jan. 30, 2014

(65) Prior Publication Data
US 2015/0175207 A1   Jun. 25, 2015

(30) Foreign Application Priority Data

Jul. 25, 2012 (JP) .................................. 2012-165063

(51) Int. Cl.
| | |
|---|---|
| *B62D 21/11* | (2006.01) |
| *B23K 20/12* | (2006.01) |
| *B23K 20/16* | (2006.01) |
| *B23K 20/227* | (2006.01) |

(52) U.S. Cl.
CPC .............. *B62D 21/11* (2013.01); *B23K 20/122* (2013.01); *B23K 20/129* (2013.01); *B23K 20/1265* (2013.01); *B23K 20/16* (2013.01); *B23K 20/2275* (2013.01); *B23K 2201/006* (2013.01); *B23K 2201/185* (2013.01); *B23K 2201/34* (2013.01); *B23K 2203/10* (2013.01); *B23K 2203/20* (2013.01); *Y10T 403/478* (2015.01)

(58) Field of Classification Search
CPC ............................. B62D 21/11; B23K 20/122
USPC ............... 280/124.109; 296/204, 205, 203.02
See application file for complete search history.

(56) References Cited

U.S. PATENT DOCUMENTS

| | | | |
|---|---|---|---|
| 2007/0024044 A1* | 2/2007 | Ogawa et al. | 280/788 |
| 2013/0249250 A1* | 9/2013 | Ohhama et al. | 296/204 |

FOREIGN PATENT DOCUMENTS

| | | |
|---|---|---|
| JP | 2007-253172 A | 10/2007 |
| JP | 2009-178750 A | 8/2009 |
| JP | 2012-121028 A | 6/2012 |

* cited by examiner

*Primary Examiner* — Faye M Fleming
(74) *Attorney, Agent, or Firm* — Carrier Blackman & Associates, P.C.; William D. Blackman; Joseph P. Carrier

(57) ABSTRACT

Disclosed is a friction-stir welded structure in which corrosion resistance of a peeling region is ensured when a film coating is peeled away from a steel sheet. In a sub-frame, an aluminum alloy member is laid over a steel member that has been electropainted, and the overlaid part where the member is laid over is friction-stir welded at inner and outer welds. The aluminum alloy member has an aluminum layered part which together with the steel member constitutes the overlaid part due to being laid over the steel member, and aluminum extending parts provided to the aluminum layered part. The aluminum extending parts have aluminum extending parts that are orthogonal to the extending direction of the inner and outer welds and that protrude outward from the steel member.

4 Claims, 7 Drawing Sheets

FIG. 7A
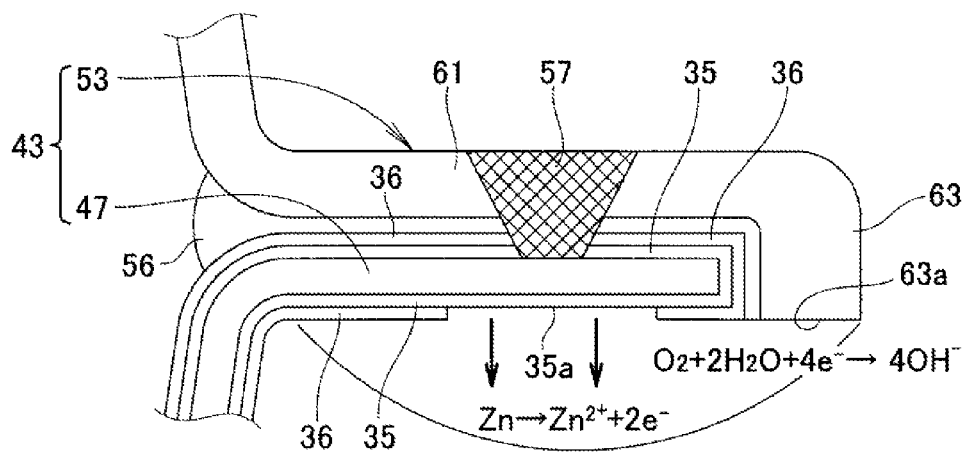
FIG. 7B
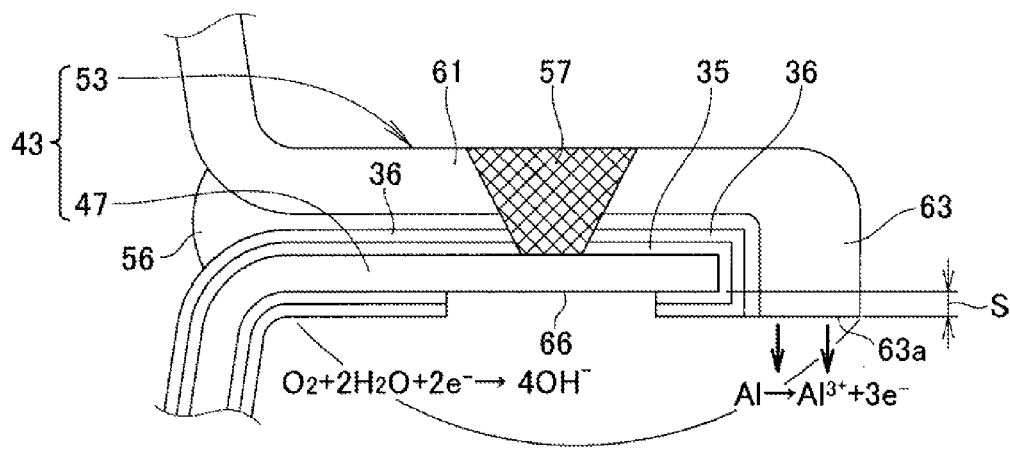
FIG.7

FRICTION-STIR WELDED STRUCTURE

TECHNICAL FIELD

The present invention relates to a friction-stir welded structure having a steel member preliminarily subjected to electrodeposition, an aluminum alloy member overlapping the steel member, and an overlapping part where the aluminum alloy member overlaps the steel member, the overlapping part having a joining portion subjected to friction-stir welding.

BACKGROUND ART

Friction-stir welding is known as a method for joining different materials such as an aluminum alloy member and a steel plate (see e.g., patent literature 1 below). In friction-stir welding the aluminum alloy member and the steel plate together, the steel plate is first placed on a back-up jig and then the aluminum alloy member is brought to overlap the steel plate. Next, a joining tool is pressed against a joining part where the aluminum alloy member overlaps the steel plate, as the tool rotates, such that a joining pin (a projection) penetrates the joining part. In this state, the joining tool is moved along the joining part to subject the joining part (i.e., the aluminum alloy member and the steel plate) to friction-stir welding.

A steel plate is plated with a zinc to form a zinc film protecting the steel plate from corrosion, after which the zinc film is coated with a resin-based coating through electrodeposition to form the resin-based coating film. When the steel plate with the resin-based coating film is friction-stir welded to an aluminum alloy member at the joint therebetween, the resin-based coating film placed on the back-up jig can be stripped due to heat generated during the friction-stir welding. When the resin-based coating film is stripped from the steel plate, it is difficult to ensure corrosion resistance of the stripped region.

To address that problem, it is thought that after the steel plate is friction-stir welded to the aluminum alloy member, the steel plate and the aluminum alloy member are subjected to electrodeposition to form a resin-based coating film thereon. The aluminum alloy member may have threaded portions etc., for example. Thus, the electrodeposition to form the resin-based coating film on the steel plate and the aluminum alloy member involves the cost for masking process to cover the threaded portions etc. Therefore, there is a need for practical use of a technique for ensuring corrosion resistance of a region of the steel plate even if the region is stripped of the resin-based coating film when the steel plate is friction-stir-welded to the aluminum alloy member after the resin-based coating film is formed on the steel plate through electrodeposition.

PRIOR ART LITERATURE

Patent Literature

Patent Literature 1: JP-A-2007-253172

SUMMARY OF INVENTION

Technical Problem

An object of the present invention is to provide a friction-stir-welded structure capable of ensuring corrosion resistance of a region of a steel plate when the region is stripped of a coating film.

Solution to Problem

According to one aspect of the present invention, as defined in claim 1, there is provided a friction-stir welded structure including a steel member preliminarily subjected to electrodeposition, an aluminum alloy member overlapping the steel member, and an overlapping part where the aluminum alloy member overlaps the steel member, the overlapping part having a joining portion subjected to friction-stir welding, the aluminum alloy member comprising: an aluminum overlapping portion overlapping the steel member, the aluminum overlapping portion and the steel member constituting the overlapping part; and an aluminum extension portion provided at the aluminum overlapping portion, the aluminum extension portion being orthogonal to a direction of extension of the joining portion and protruding outwardly of the steel member.

Preferably, as defined in claim 2, the aluminum extension portion has an aluminum projecting part projecting toward a side of the steel member, the aluminum projecting part having an end edge projecting beyond a surface of the steel member, the surface of the steel member being opposite the aluminum overlapping portion.

Preferably, as defined in claim 3, the steel member is a steel plate on which a zinc plating film is formed.

Preferably, as defined in claim 4, the steel member comprises: steel side portions on opposite sides, the steel side portions being disposed at a predetermined interval therebetween; and a steel connecting portion interconnecting the steel side portions, the steel side portions and the steel connecting portion defining a general U-shape as viewed in plan. The aluminum alloy member comprises: aluminum side portions on opposite sides, the aluminum side portions being disposed at a predetermined interval therebetween; and an aluminum connecting portion interconnecting the aluminum side portions, the aluminum side portions and the aluminum connecting portion defining a general U-shape as viewed in plan. The aluminum side portions overlap the steel side portions such that the steel member and the aluminum alloy member define the friction-stir welded structure having a generally rectangular shape as viewed in plan. The aluminum side portions overlap the steel side portions to define the overlapping part on each of opposite sides. The overlapping part comprises: a closed cross-sectional portion of a closed cross-section; and a pair of flange portions protruding outwardly from the closed cross-sectional portion. Each of the flange portions comprises: a steel flange overlapping the aluminum overlapping portion; and an aluminum flange defined by the aluminum overlapping portion and the aluminum extension portion, and at least one of the pair of flange portions is subjected to friction-stir welding at the joining portion.

Preferably, as defined in claim 5, the friction stir-welded structure having the generally rectangular shape as viewed in plan is a vehicular sub-frame supporting left and right vehicular suspensions.

Advantageous Effects of Invention

As defined in claim 1, the aluminum extension portion is provided at the aluminum overlapping portion, and the aluminum extension portion protrudes outwardly of the steel member. Aluminum (Al) of the aluminum alloy member has a stronger ionization tendency than iron (Fe) A the steel member. That is, Al is "Poorer" than Fe. Thus, electrons of the aluminum extension portion (Al), which protrudes outwardly of the steel member, are supplied to a stripped region having a coating film of the steel member stripped, such that electron release from the stripped region (Fe) is prevented. That is, sacrificial anti-corrosion effect on the stripped region is achieved to ensure corrosion resistance of the stripped region and thus protect the stripped region.

Further, after the steel member is preliminarily subjected to electrodeposition, the steel member is friction-stir welded to the aluminum alloy member. This makes it possible to reduce the cost without incurring the cost of masking process covering threaded portions etc. of the aluminum alloy member.

As defined in claim 2, the aluminum projecting part of the aluminum extension portion projects toward the side of the steel member, and the end edge of the aluminum projecting part projects beyond the steel member. As a result, the end edge of the aluminum projecting part projects beyond the stripped region. Thus, electrons of the end edge (AD can be efficiently supplied to the stripped region to thereby better prevent electron release from the stripped region (Fe) and thus achieve a better sacrificial anti-corrosion effect.

As defined in claim 3, since the zinc plating film is formed on the steel member, the zinc plating film can be coated with a coating film through electrodeposition. The dual layer of the zinc plating film and the coating film, which is applied to the steel member, enhances a corrosion resistance of the steel member.

Even if the coating film is stripped during friction-stir welding, the zinc plating film remains on the stripped region. Zinc (Zn) of the zinc plating film has a stronger ionization tendency than aluminum (Al) of the aluminum alloy member. That, is, Zn is "poorer" than Al. Thus, electrons of the zinc plating film (Zn) on the stripped region are supplied to the aluminum extension portion (Al) to thereby provide sacrificial anti-corrosion effect on the aluminum extension portion (Al). After removal of the zinc plating film from the stripped region, electrons of the aluminum extension portion (Al) are supplied to the stripped region to thereby prevent electron release from the stripped region (Fe). Thus, sacrificial anti-corrosion effect on the stripped region is achieved to ensure corrosion resistance of the stripped region and thus protect the stripped region.

As defined in claim 4, the overlapping part includes the pair of flange portions, and each flange portion is composed of a steel flange of the steel member and an aluminum, flange of the aluminum alloy member. In addition, at least one of the pair of flange portions is subjected to friction-stir welding. Electrons of the aluminum flange (Al) are supplied to the stripped region of the steel flange to thereby prevent, electron release from the stripped region (Fe). Thus, sacrificial anti-corrosion effect on the steel flange is achieved to ensure corrosion resistance of the stripped region.

Since the corrosion resistance of the steel flange (the stripped region) is ensured, the steel member alone can be subjected to electrodeposition before the steel member and the aluminum, alloy member are joined together to form the friction-stir welded structure having the generally rectangular shape as viewed in plan. Thus, it is not necessary to subject the entirety of the friction-stir welded structure after the steel member and the aluminum alloy member are joined together to form the friction-stir welded structure having the generally rectangular shape as viewed in plan. That is, the electrodeposition is facilitated to thereby enhance the productivity of the friction-stir welded structure.

As defined in claim 5, the friction-stir welded structure having the generally rectangular shape is used as the vehicular sub-frame. The vehicular sub-frame is a member supporting the left and right suspensions 15 etc. (FIG. 1) and, thus, is required to provide the friction-stir welded structure with sufficient strength and rigidity. To this end, the overlapping part of the friction-stir welded structure is formed by the closed cross-sectional portion 41 and the pair of flange portions, and the pair of flange portions protrudes outwardly from the closed cross-sectional portion. The joining portion of the flange portion (the steel flange and the aluminum flange) protruding from the closed cross-sectional portion is subjected to the friction-stir welding. Thus, the sufficient strength and rigidity of the overlapping part can be ensured due to the closed cross-sectional portion even if electrons are released from the aluminum extension portion (Al) of the aluminum flange to provide sacrificial anti-corrosion effect on the stripped region. In short, the sufficient strength and rigidity of the friction-stir welded structure is ensured due to the closed cross-sectional portion of the overlapping part.

BRIEF DESCRIPTION OF DRAWINGS

FIGS. 7A-7B are views illustrating examples in which the outer side steel flange (stripped region) of the sub-frame is protected by sacrificial anti-corrosion effect in accordance with the present invention;

DESCRIPTION OF EMBODIMENT

A certain preferred embodiment of the present invention is described below with reference to the accompanying drawings. The reference signs "Fr", "Rr", "L" and "R" denote front, rear, left and right directions, respectively, in which a driver views.

Embodiment

Although a friction-stir welded structure 14 has been discussed as a sub-frame (vehicular sub-frame) in an embodiment, the structure 14 is not limited to the sub-frame.

Figure 1:
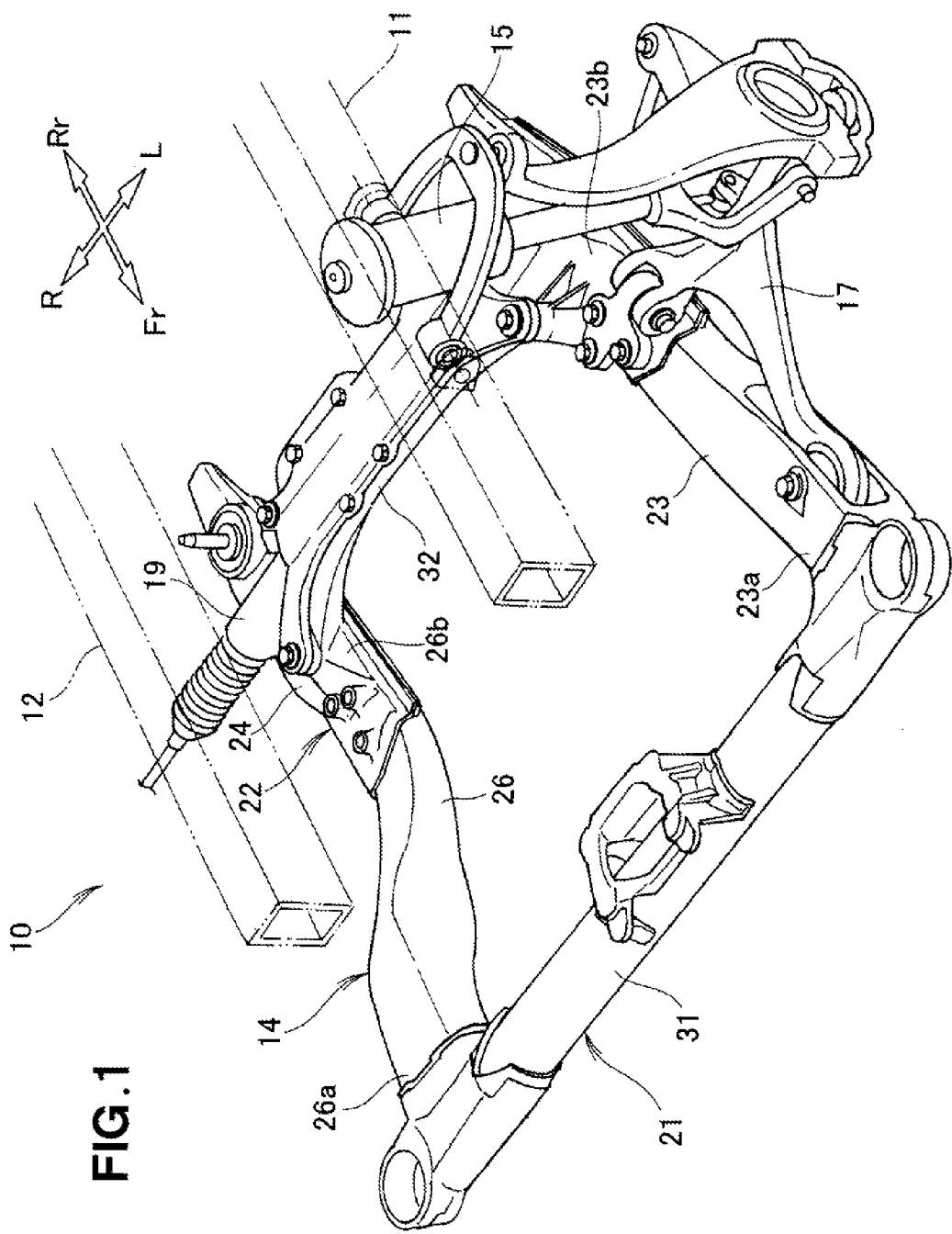
FIG. 1 is a perspective view of a vehicle including a friction-stir welded structure (sub-frame) according to the present invention.

As shown in FIG. 1, a vehicle 10 includes left and right front side frames (frame members) 11, 12 provided on left and right sides of the vehicle 10 and extending in a front-rear direction of the vehicle. The vehicle 10 also includes the sub-frame 14 provided below the left and right front side frames 11, 12, and a power source (not shown) supported by the sub-frame 14. The vehicle 10 further includes left and right front suspensions 15 (the right front suspension not shown), and a steering gear box 19 provided on an upper part of the sub-frame 14.

The steering gear box 19 is a cylindrical case accommodating a steering gear (not shown) etc. A steering shaft extending from the steering gear box 19 is attached to a steering wheel. The steering wheel is steered to change a direction in which the vehicle 10 travels.

The left front suspension 15 is supported by a left side member 23 of the sub-frame 14 through a left lower arm 17. The right front suspension is supported by a right side member 26 through a right lower arm, as in the left front suspension 15.

Figure 2:
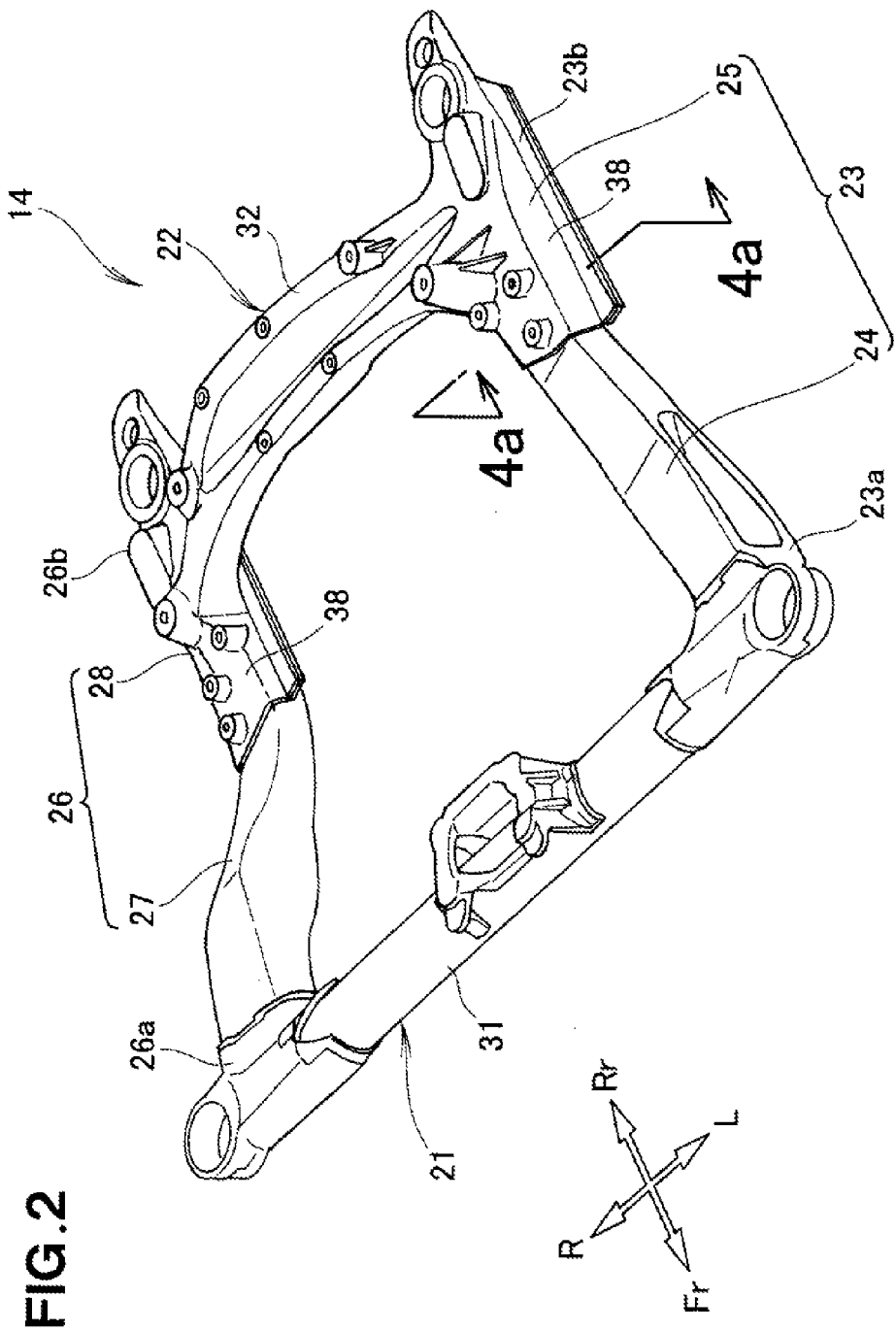
FIG. 2 is a perspective view of the sub-frame shown in FIG. 1.

As shown in FIGS. 1 and 2, the sub-frame 14 has a rectangular shape defined by the left side member 23, the right side member 26, a front cross member (a steel connecting portion) 31 and a rear cross member (an aluminum connecting portion) 32. The left side member 23 is provided on the left side of the vehicle 10 and extending in the front-rear direction of the vehicle. The right side member 26 is provided on the right side of the vehicle 10 and extending in the front-rear direction of the vehicle. The front cross member 31 interconnects front end portions 23a, 26a of the left and right side members 23, 26. The rear cross member 32 interconnects rear end portions 23b, 26b of the left and right side members 23, 26.

Figure 3:
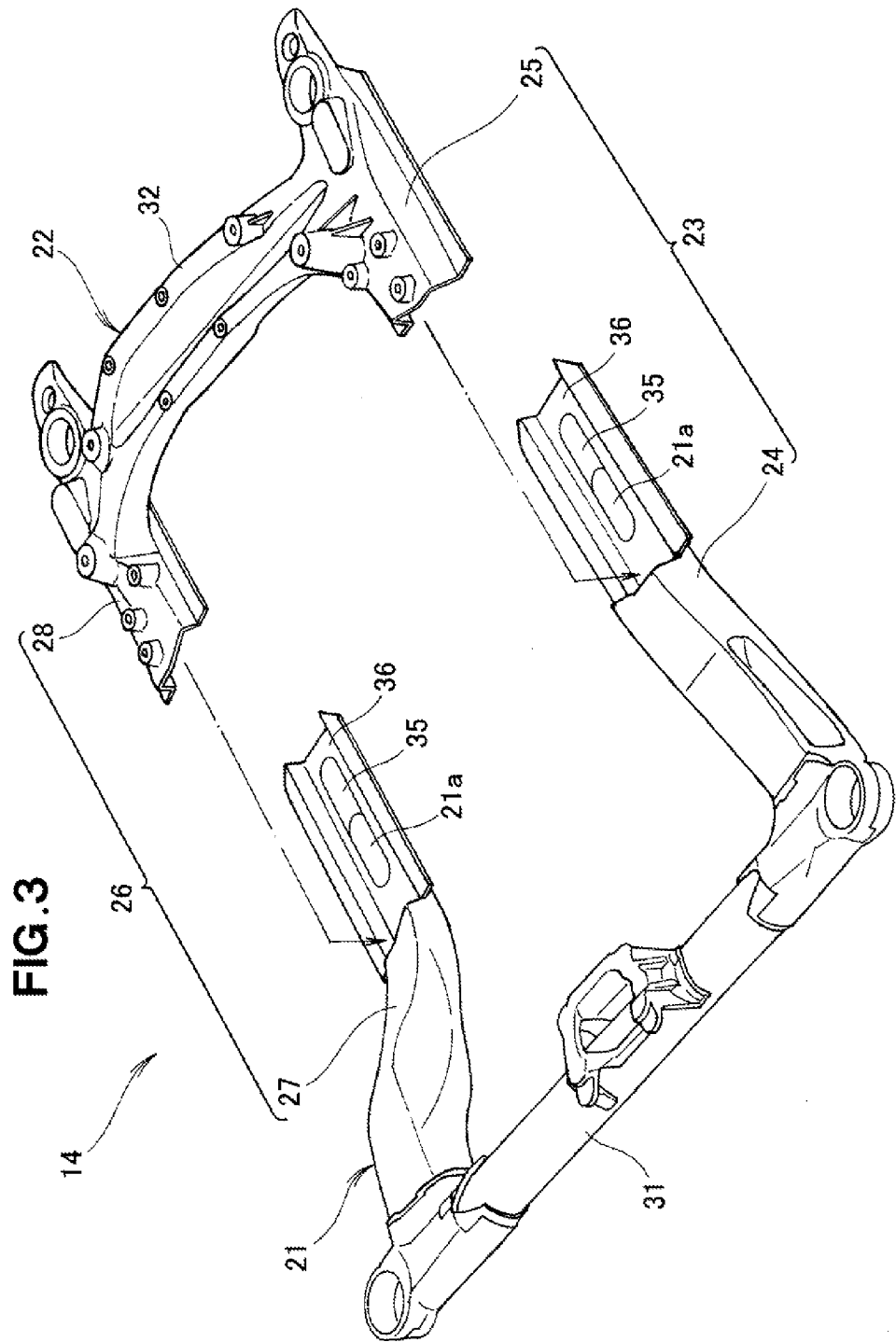
FIG. 3 is an exploded perspective view of the sub-frame shown in FIG. 2.

As shown in FIGS. 2 and 3, the left side member 23 is formed by a left steel side portion 24 made of a steel material, and a left aluminum side portion 25 made of an aluminum alloy material. The right, side member 26 is formed by a right steel side portion 27 made of a steel material, and a right aluminum side portion 28 made of an aluminum alloy material.

The left steel side portion 24 and the right steel side portion 27 (i.e., the steel side portions 24, 27 on the opposite sides) are disposed at a predetermined interval therebetween. The left steel side portion 24, the right steel side portion 27, and the steel front cross member 31 interconnecting the left and right steel side portions 24, 27 define a steel member 21.

The steel member 21 is a steel plate which is generally U-shaped as viewed in plan. The general U-shape of the steel member 21 is formed by the left and right steel side portions 24, 27 and the front cross member 31. The steel member 21 has a surface 21a plated with a zinc film 35, and the zinc plating film 35 has a surface on which a resin-based coating film 36 is formed through electrodeposition (cathodic electrodeposition) (see FIG. 4B). The dual layer formed by the zinc plating film 35 and the coating film 36 is applied to the steel member 21 to enhance a corrosion resistance of the steel member 21.

The left aluminum side portion 25 and the right aluminum side portion 28 (i.e., the aluminum side portions 25, 28 on the opposite sides) are disposed at a predetermined interval therebetween. The left aluminum side portion 25 and the right aluminum side portion 28 (i.e., the aluminum side portions 25, 28 on the opposite sides) and the aluminum-alloy rear cross member 32 interconnecting the left and right aluminum side portions 25, 28 define an aluminum alloy member 22.

The aluminum alloy member 22 is an aluminum alloy casting which is cast from aluminum alloy to have a general U-shape (more specifically a general I-shape) as viewed in plan. The general U-, or I-shape is defined by the left and right aluminum side portions 25, 28 and the rear cross member 32. The aluminum alloy member 22 is friction-stir welded to the steel member 21 in an overlapping relationship therewith, such that the steel member 21 and the aluminum alloy member 22 form the sub-frame 14 having a generally rectangular shape as viewed in plan.

As shown in FIGS. 4A-4B, the left aluminum side portion 25 overlaps the left steel side portion 24 to thereby form an overlapping part (a left overlapping part) 38. The overlapping part 38 includes a closed cross-sectional portion 41 of a closed cross-section, and inner and outer flange portions (a pair of flange portions) 42, 43 protruding outwardly from the closed cross-sectional portion 41. That is, the inner flange portion 42 is subjected to friction-stir welding at an inside joining portion (a joining region) 55 and the outer flange portion 43 is subjected to friction-stir welding at an outside joining portion (a joining region) 57, such that the left steel side portion 24 and the left aluminum side portion 25 constitute the overlapping part 38.

The left steel side portion 24 has a generally U-shaped cross-sectional steel side body 45 protruding downwardly. The left steel side portion 24 also has an inner side steel flange (a steel flange) 46 provided at an inside portion 45a of the steel side body 45, and an outer side steel flange (a steel flange) 47 provided at an outside portion 45b of the steel side body 45. The inner side steel flange 46 protrudes from the inside portion 45a of the steel side body 45 in a widthwise inward direction of the vehicle. The outer side steel flange 47 protrudes from the outside portion 45b of the steel side body 45 in a widthwise outward direction of the vehicle.

The left aluminum side portion 25 has a generally trapezoidal cross-sectional aluminum side body 51 protruding upwardly. The left aluminum side portion 25 also has an inner side aluminum flange (an aluminum flange) 52 provided at an inside portion 51a of the aluminum side body 51, and an outer side aluminum flange (an aluminum flange) 53 provided at an outside portion 51b of the aluminum side body 51. The inner side aluminum flange 52 protrudes from the inside portion 51a of the aluminum side body 51 in the widthwise inward direction of the vehicle. The outer side aluminum flange 53 protrudes from the outside portion 51b of the aluminum side body 51 in the widthwise outward direction of the vehicle.

The inner flange portion 42 is formed by friction-stir welding at the inside joining portion 55 with the inner side aluminum flange 52 overlapping the inner side steel flange 46. A sealant 56 is interposed between the inner side steel flange 46 and the inner side aluminum flange 52.

The outer flange portion 43 is formed by friction-stir welding at the outside joining portion 57 with the outer side aluminum flange 53 overlapping the outer side steel flange 47. A sealant 56 is interposed between the outer side steel flange 47 and the outer side aluminum flange 53. The sealant 56 is interposed between the outer side steel flange 47 and the outer side aluminum flange 53 before the friction-stir welding is performed on the outer flange portion 43.

The inner side steel flange 46 and the inner side aluminum flange 52 are joined together at the inside joining portion 55. The outer side steel flange 47 and the outer side aluminum flange 53 are joined together at the outside joining portion 57. As a result, the steel side body 45 and the aluminum side body 51 are stacked together to provide a closed cross-sectional shape. That is, the closed cross-sectional shape provided by stacking the steel side body 45 and the aluminum side body 51 together form the closed, cross-sectional portion 41.

Figure 4:
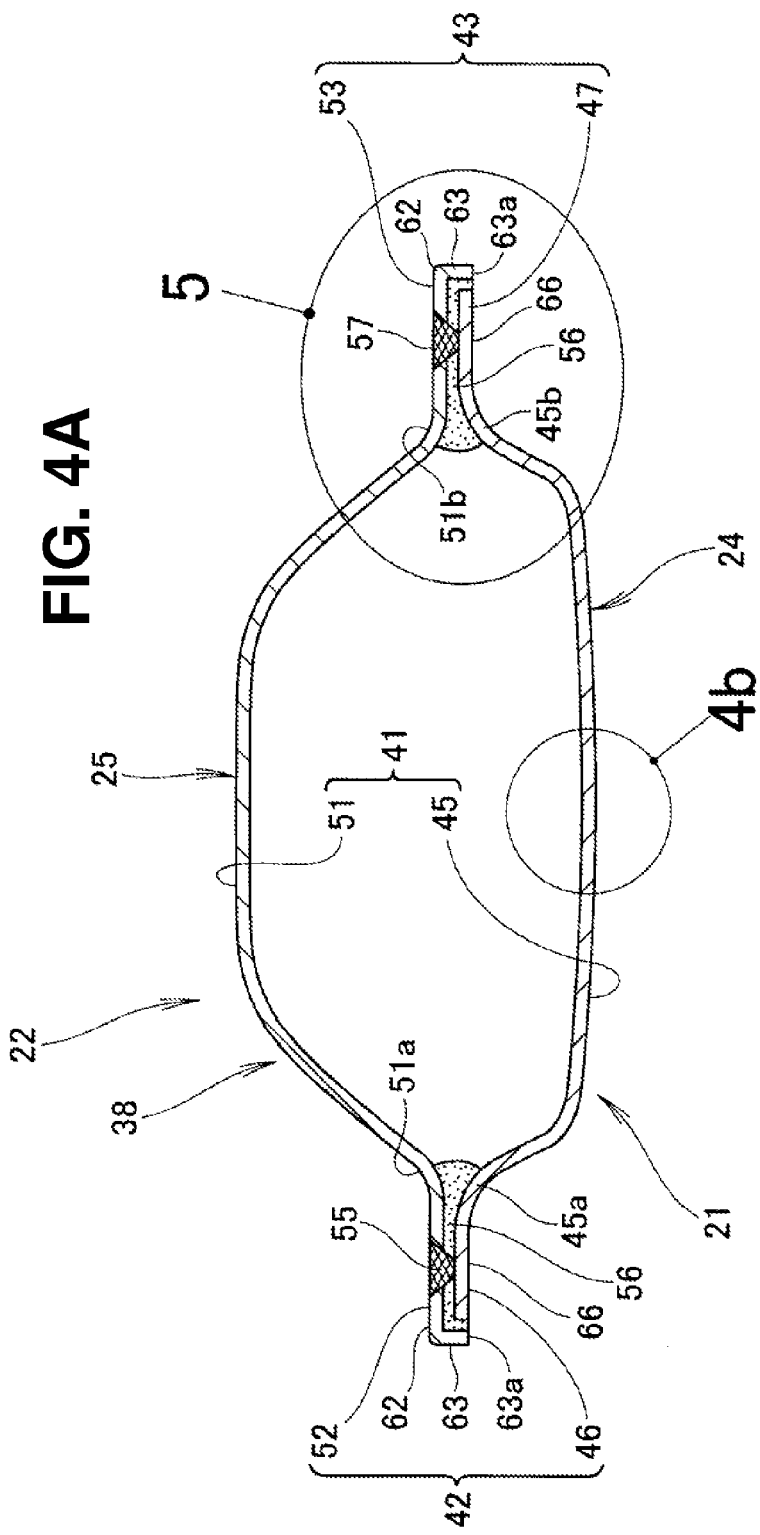
FIG. 4A is a cross-sectional view taken along line 4a-4a of FIG. 2
FIG. 4B is an enlarged view of a part 4b of FIG. 4A.
Figure 5:
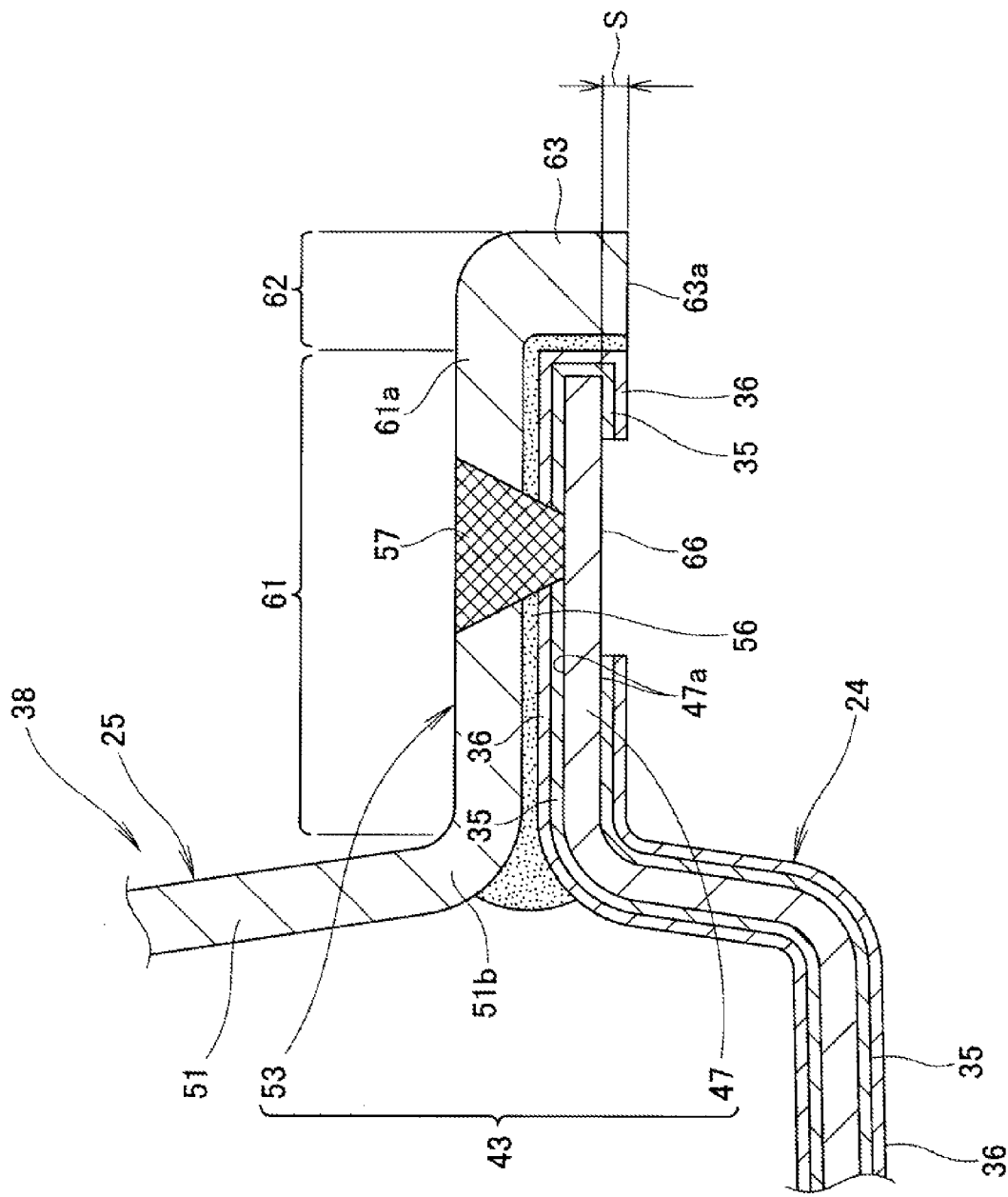
FIG. 5 is an enlarged view of a part 5 of FIG. 4(a)

As shown in FIG. 5, the outer side steel flange 47 has a surface 47a (i.e., the surface 21a of the steel member 21 (FIG. 4B) on which the zinc plating film 35 is formed, and the zinc plating film 35 has the surface on which the coating film 36 is formed. The outer side steel flange 47 overlaps an aluminum overlapping portion 61 of the outer side aluminum flange 53.

The outer side aluminum flange 53 has the aluminum overlapping portion 61 protruding from the outside portion 51b of the aluminum side body 51 in the widthwise outward direction of the vehicle, and an aluminum extension portion 62 protruding from an outer end portion 61a of the aluminum overlapping portion 61.

The aluminum overlapping portion 61 is a member overlapping the outer side steel flange 47 and is subjected to friction-stir welding at the outside joining portion 57 in an overlapping relationship with the outer side steel flange 47. The aluminum extension portion 62 is provided at the outer end portion 61a of the aluminum overlapping portion 61. The aluminum extension portion 62 is orthogonal to a direction of extension of the overlapping part 38 (a direction orthogonal to the sheet of the figure) and protrudes outwardly of the outer side steel flange 47 in the widthwise direction of the vehicle. In other words, the aluminum extension portion 62 is orthogonal to a direction of movement of a joining tool 82 (FIG. 6A) (the direction orthogonal to the sheet of the figure) and protrudes outwardly of the outer side steel flange 47 in the widthwise direction of the vehicle.

The aluminum extension portion 62 has an aluminum projecting part 63. The aluminum projecting part 63 projects toward a side of a surface 47a of the outer side steel flange 47 opposite the aluminum overlapping portion 61. More specifically, the aluminum projecting part 63 has an end edge 63a projecting beyond the opposite surface 47a by a projection dimension S. The reason the end edge 63a of the aluminum projecting part 63 projects beyond the opposite surface 47a is discussed later.

In the outer flange portion 43 subjected to friction-stir welding at the outside joining portion 57, the outer side steel flange 47 (i.e., the opposite surface 47a) includes a stripped region 66 having the coating film 36 and the zinc plating film 35 removed (stripped). Aluminum (Al) of the aluminum projecting part 63 (the end edge 63a) has a stronger ionization tendency than iron (Fe) of the stripped region 66. That is, Al is "poorer" than Fe.

Since the aluminum extension portion 62 protrudes outwardly of the outer side steel flange 47, electrons of Al are supplied from the end edge 63a of the aluminum projecting part 63 to the stripped region 66 to thereby prevent release of electrons of the stripped region 66. As a result, sacrificial anti-corrosion effect on the stripped region 66 is achieved to ensure corrosion resistance of the stripped region 66 and hence protect the stripped region 66.

As shown in FIG. 2, the right steel side portion 27 is symmetrical to the left steel side portion 24, and hence the respective elements of the right steel side portion 27 are denoted by the same reference numerals as those of the left steel side portion 24 and the detailed discussion of these elements is omitted. The right, aluminum side portion 28 is symmetrical to the left aluminum side portion 25, and hence the respective elements of the right aluminum side portion 28 are denoted by the same reference numerals as those of the left aluminum side portion 25 and the detailed discussion of these elements is omitted. The right overlapping part formed by the right steel side portion 27 and the right aluminum side portion 28 is denoted by the same reference numeral "38" as that of the left overlapping part, and the detailed discussion of the right overlapping part 38 is omitted.

As shown in FIGS. 4A-4B, the overlapping part 38 includes the inner and outer flange portions 42, 43. The outer flange portion 43 is composed of the outer side steel flange 47 and the outer side aluminum flange 53 and is subjected to friction-stir welding at the outside joining portion 57. The inner flange portion 42 is composed of the inner side steel flange 46 and the inner side aluminum flange 52 and is subjected to friction-stir welding at the inside joining portion 55.

Electrons of Al of the outer side aluminum flange 53, i.e., the aluminum projecting part 63 (the end edge 63a) are supplied to the stripped region 66 of the inner side steel flange 47 to thereby prevent electrons of Fe from being released from the stripped region 66. Similarly, electrons of Al of the inner side aluminum flange 52, i.e., the aluminum projecting part 63 (the end edge 63a) are supplied to the stripped region 66 of the inner side steel flange 46 to thereby prevent electrons of Fe from being released from the stripped region 66. This results in sacrificial anti-corrosion effect on the stripped regions 66 of the inner and outer side steel flanges 46, 47, thereby ensuring the corrosion resistance of the stripped regions 66.

Since the corrosion resistance of the stripped regions 66 is ensured, the steel member 21 only can be subjected to electrodeposition before the steel member 21 and the aluminum alloy member 22 are joined together to form the sub-frame 14 having the generally rectangular shape as viewed in plan. In other words, it is not necessary to subject the entirety of the sub-frame 14 to electrodeposition after the steel member 21 and the aluminum alloy member 22 are joined together to form the sub-frame 14, as shown in FIG. 2. This is advantageous because the electrodeposition is facilitated, which enhances the productivity of the sub-frame 14.

The friction-stir welded structure having the generally rectangular shape as viewed in plan is used as the vehicular sub-frame (a sub-frame) 14. The sub-frame 14 is a member supporting the left and right suspensions 15 etc. (FIG. 1) and, thus, is required to have sufficient strength and rigidity. To this end, as shown in FIGS. 2 and 4, each of the left and right overlapping parts (the overlapping parts on the opposite sides) 38 is formed by the closed cross-sectional portion 41 and the inner and outer flange portions 42, 43, and the inner and outer flange portions 42, 43 protrude outwardly from the closed cross-sectional portion 41.

Additionally, the inner flange portion 42 (the inner side steel flange 46 and the inner side aluminum flange 52) protruding from the closed cross-sectional portion 41 is subjected to friction-stir welding at the inside joining portion 55. Also, the outer flange portion 43 (the outer side steel flange 47 and the outer side aluminum, flange 53) protruding from the closed cross-sectional portion 41 is subjected to friction-stir welding at the outside joining portion 57.

Thus, the overlapping part 38 ensures its sufficient strength and rigidity due to the closed cross-sectional portion 41 even though electrons of Al are discharged from the inner and outer side aluminum flanges 52, 53 (i.e., the aluminum projecting part 63) to provide the sacrificial anti-corrosion to the stripped regions 66. In short, the sufficient strength and rigidity of the sub-frame 14 can be ensured by the closed cross-sectional portion 41 of the overlapping part.

Next, an example of friction-stir welding the outer side steel flange 47 of the left steel side portion 24 and the outer side aluminum flange 53 of the left aluminum side portion 25 is discussed with reference to FIGS. 6A-6B.

Figure 6A:
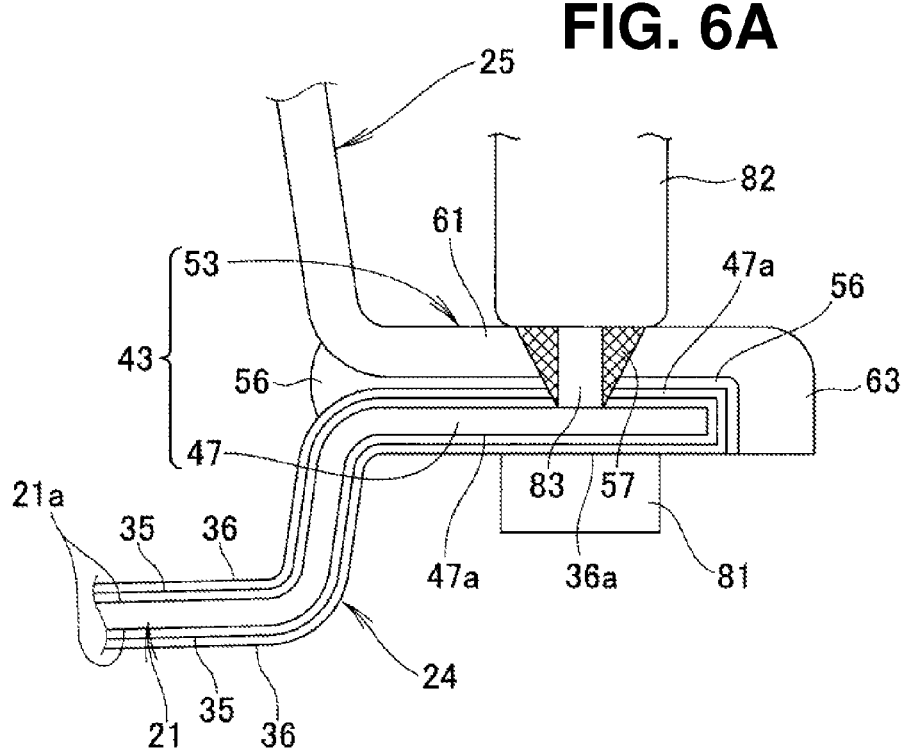
FIGS. 6A and 6B are views illustrating examples of friction-stir welding an outer side steel flange and an outer side aluminum flange to form the sub-frame in accordance with the present invention.

As shown in FIG. 6A, the zinc plating film 35 is formed on the surface 21a of the steel member 21, and the coating film 36 is formed on the surface of the zinc plating film 35 through electrodeposition. That is, the zinc plating film 35 and the coating film 36 are preliminarily formed on the surface 47a of the outer side steel flange 47.

The outer side steel flange 47 with the zinc plating film 35 and the coating film 36 formed thereon are placed on a back-up jig 81. Then, the aluminum overlapping portion 61 of the outer side aluminum flange 53 is brought to overlap the outer side steel flange 47 from above. The aluminum overlapping portion 61 overlapping the outer side steel flange 47 is pressed by the joining tool 82 from above, as the joining tool 82 is rotated, such that a joining pin 83 of the joining tool 82 penetrates the aluminum overlapping portion 61. In this state, the joining tool 82 is moved along the outer side aluminum flange 53, such that the aluminum overlapping portion 61 and the outer side steel flange 47 are friction-stir welded together at the outside joining portion 57.

While the aluminum overlapping portion 61 and the outer side steel flange 47 are friction-stir welded together, the outer side steel flange 47 is placed on the back-up jig 81. As a result, heat generated during the friction-stir welding of the aluminum overlapping portion 61 and the outer side steel flange 47 strips the outer side steel flange 47 of a region 36a of the coating film 36 on the outer side steel flange 47, which region 36a was placed on the back-up jig 81.

Figure 6B:
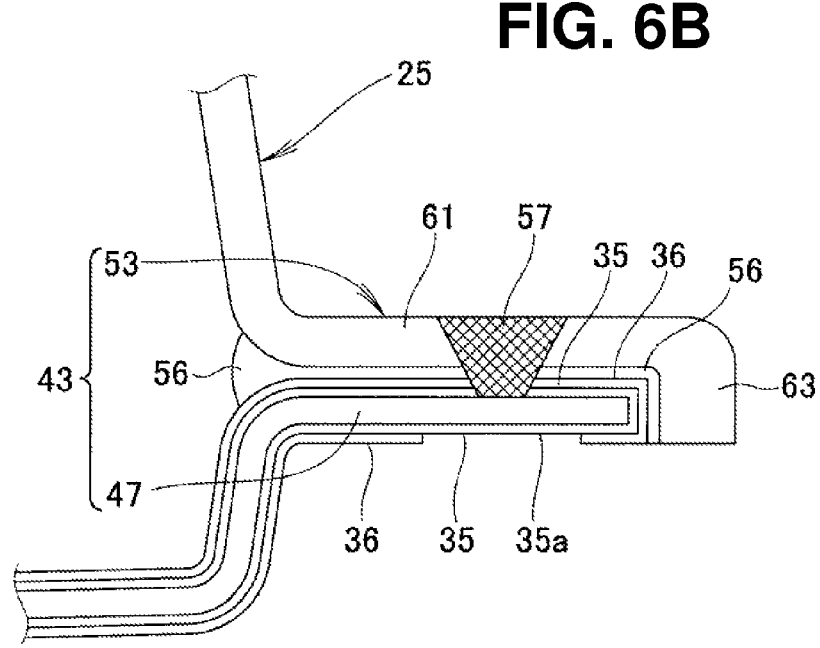

As shown in FIG. 6B, the coating film 36 (i.e., the region 36a (FIG. 6A) which was placed on the back-up jig 81) is stripped to expose a stripped region 35a of the zinc plating film 35 to the outside.

Next, an example in which the stripped region 66 having the coating film 36a stripped is protected due to sacrificial anti-corrosion effect is discussed with reference to FIGS. 7A-7B. It is understood that the sealant 36, which is interposed between the outer side steel flange 47 and the outer side aluminum flange 53, does not hinder formation of a circuit ensuring the sacrificial anti-corrosion effect.

As shown in FIG. 7A, the stripped region 35a of the zinc plating film 35 is exposed to moisture in the air or splashed with water from the ground. Zinc (Zn) of the zinc plating film 35 has a stronger ionization tendency than aluminum (Al) of the aluminum projecting part 63 (the end edge 63a). That is, Zn is "poorer" than Al. As a result, electrons of Zn are supplied from the stripped region 35a to the end edge 63a to thereby provide sacrificial anti-corrosion effect on the end edge 63a.

As shown in FIG. 7B, the stripped region 35a (FIG. 7A) is removed and, thus, the stripped region 66 of the outer side steel flange 47 is exposed to moisture in the air or splashed with water from the ground. Aluminum (Al) of the aluminum projecting part 63 (the end edge 63a) has a stronger ionization tendency than iron (Fe) of the outer side steel flange 47. That is, Al is "poorer" than Fe.

Since the aluminum extension portion 62 (FIG. 5) protrudes from the aluminum overlapping portion 61 outwardly of the outer side steel flange 47, thus, electrons of Al are supplied from the aluminum extension portion 62 (FIG. 5) to the stripped region 66, such that release of electrons of Fe from the stripped region 66 is prevented. This achieves sacrificial anti-corrosion effect on the stripped region 66 to ensure the corrosion resistance of the stripped region 66 and hence protect the stripped region 66.

Since the end edge 63a of the aluminum projecting part 63 projects beyond the stripped region 66 by the projection dimension 5, electrons of Al can be efficiently supplied from the aluminum projecting part 63 (the end edge 63a) to the stripped region 66 to thereby well prevent electrons of Fe from being released from the stripped region 66. This results in further improved sacrificial anti-corrosion effect.

To form the sub-frame 14, the steel member 21 is preliminarily subjected to electrodeposition to form the coating film 36 thereon, after which the steel member 21 is friction-stir welded to the aluminum alloy member 22. This makes it possible to reduce the cost without incurring the cost for masking process covering threaded portions etc. of the aluminum alloy member 22.

The friction-stir welded structure according to the present invention is not limited to that discussed in the foregoing embodiment, but may be appropriately modified or improved. For example, although the vehicular sub-frame 14 has been discussed as the friction-stir welded structure in the embodiment, the friction-stir welded structure may be another structure formed by friction-stir welding an aluminum alloy member and a steel member.

Although the inner and outer flange portions 42, 43 are both subjected to friction-stir welding in the embodiment, either the inner flange portion 42 or the outer flange portion 43 may be subjected to friction-stir welding.

Although the sealants 56 are interposed between the inner side steel flange 46 and the inner side aluminum flange 52 and between the outer side steel flange 47 and the outer side aluminum flange 53 in the embodiment, no sealants 56 may be provided.

The vehicle 10, the sub-frame 14, the left and right front suspensions 15, the steel member 21, the aluminum alloy member 22, the left and right steel side portions 24, 27, the left and right aluminum side portions 25, 28, the front cross member 31, the rear cross member 32, the left and right overlapping parts 38, the closed, cross-sectional portion 41, the inner and outer flange portions 42, 43, the inner and outer side steel flanges 46, 47, the inner and outer side aluminum flanges 52, 53, the aluminum overlapping portion 61, the aluminum extension portion 62 and the aluminum projecting part 63 are not limited to the exemplary ones discussed above, but may have appropriately modified shapes or structures.

INDUSTRIAL APPLICABILITY

The present invention is suitable for an automobile including a structure having a steel member subjected to electrodeposition, an aluminum alloy member overlapping the steel member, and an overlapping part where the aluminum alloy member overlaps the steel member, the overlapping part is subjected to friction-stir welding.

REFERENCE SIGNS LIST

10 . . . vehicle, 14 . . . sub-frame, 15 . . . left and right front suspensions, 21 . . . steel member, 22 . . . aluminum alloy member, 24, 27 . . . left and right steel side portions, 25, 28 . . . left and right aluminum side portions, 31 . . . front cross member, 32 . . . rear cross member, 35 . . . zinc plating film, 36 . . . coating film, 38 . . . left and right overlapping parts, 41 . . . closed cross-sectional portion, 42, 43 . . . inner and outer flange portions, 46, 47 . . . inner and outer side steel flanges, 47a . . . opposite surface, 52, 53 . . . inner and outer side aluminum flanges, 55, 57 . . . inside and outside joining portions, 61 . . . aluminum overlapping portion, 62 . . . aluminum extension portion, 63 . . . aluminum projecting part, 63a . . . end edge of the aluminum projecting part

The invention claimed is:

1. A friction-stir welded structure including a steel member preliminarily subjected to electrodeposition, an aluminum alloy member overlapping the steel member, and an overlapping part where the aluminum alloy member overlaps the steel member, the overlapping part having a joining portion subjected to friction-stir welding, the aluminum alloy member comprising:

an aluminum overlapping portion overlapping the steel member, the aluminum overlapping portion and the steel member constituting the overlapping part; and an aluminum extension portion provided at the aluminum overlapping portion, the aluminum extension portion intersecting a direction of extension of the joining portion and protruding outwardly of the steel member, wherein the aluminum extension portion has an aluminum projecting part projecting toward a side of the steel member, wherein the steel member has a coating film on a surface thereof, and the surface of the steel member has a stripped region opposite from the aluminum overlapping portion, the stripped region being without the coating film, and wherein the aluminum projecting part has an end edge reaching at least a level flush with the lower surface of the steel member at the stripped region.

2. A friction-stir welded structure including a steel member preliminarily subjected to electrodeposition, an aluminum alloy member overlapping the steel member, and an overlapping part where the aluminum alloy member overlaps the steel member, the overlapping part having a joining portion subjected to friction-stir welding, the aluminum alloy member comprising:

an aluminum overlapping portion overlapping the steel member, the aluminum overlapping portion and an overlapped portion of the steel member constituting the overlapping part; and an aluminum extension portion provided at the aluminum overlapping portion, the aluminum extension portion being orthogonal to a direction of extension of the joining portion and protruding outwardly of the steel member, wherein the aluminum extension portion has an aluminum projecting part projecting toward a side of the steel member, the aluminum projecting part having an end edge projecting beyond a surface of the steel member, the surface of the steel member being opposite the aluminum overlapping portion, wherein the steel member comprises:

steel side portions on opposite sides, the steel side portions being disposed with a predetermined interval therebetween; and a steel connecting portion interconnecting the steel side portions, the steel side portions and the steel connecting portion defining a general U-shape as viewed in plan, wherein the aluminum alloy member comprises:

aluminum side portions on opposite sides, the aluminum side portions being disposed with a predetermined interval therebetween; and an aluminum connecting portion interconnecting the aluminum side portions, the aluminum side portions and the aluminum connecting portion defining a general U-shape as viewed in plan, wherein the aluminum side portions overlap the steel side portions such that the steel member and the aluminum alloy member define the friction-stir welded structure having a generally rectangular shape as viewed in plan, wherein the aluminum side portions overlap the steel side portions to define the overlapping part on each of opposite sides, wherein the overlapping part comprises:

a closed cross-sectional portion of a closed cross-section; and a pair of flange portions protruding outwardly from the closed cross-sectional portion, wherein each of the flange portions comprises:

a steel flange overlapping the aluminum overlapping portion; and an aluminum flange defined by the aluminum overlapping portion and the aluminum extension portion, and wherein at least one of the pair of flange portions is subjected to friction-stir welding at the joining portion.

3. The structure of claim 2, wherein the friction stir-welded structure having the generally rectangular shape as viewed in plan is a vehicular sub-frame supporting left and right vehicular suspensions.

4. The structure of claim 1, wherein the coating is a metal plating comprising zinc.

* * * * *